United States Patent
Reckin

(10) Patent No.: US 10,451,186 B2
(45) Date of Patent: Oct. 22, 2019

(54) VALVE

(71) Applicant: TECHNOPAK LIMITED, Auckland (NZ)

(72) Inventor: Shane Robert Reckin, Auckland (NZ)

(73) Assignee: TECHNOPAK LIMITED, Auckland (NZ)

( * ) Notice: Subject to any disclaimer, the term of this patent is extended or adjusted under 35 U.S.C. 154(b) by 0 days.

(21) Appl. No.: 15/557,931

(22) PCT Filed: Mar. 13, 2016

(86) PCT No.: PCT/NZ2016/050037
§ 371 (c)(1),
(2) Date: Sep. 13, 2017

(87) PCT Pub. No.: WO2016/148581
PCT Pub. Date: Sep. 22, 2016

(65) Prior Publication Data
US 2018/0051812 A1 Feb. 22, 2018

(30) Foreign Application Priority Data
Mar. 13, 2015 (NZ) ........................................ 705996

(51) Int. Cl.
*F16K 1/226* (2006.01)
*F16K 1/22* (2006.01)
(Continued)

(52) U.S. Cl.
CPC ............ *F16K 1/222* (2013.01); *F16K 1/2263* (2013.01); *F16K 25/005* (2013.01); *F16K 25/04* (2013.01); *F16K 27/0218* (2013.01)

(58) Field of Classification Search
CPC ... F16K 1/18; F16K 1/22; F16K 1/221; F16K 1/222; F16K 1/223; F16K 1/226;
(Continued)

(56) References Cited

U.S. PATENT DOCUMENTS 3,960,364 A   6/1976   Hargrave
4,527,771 A   7/1985   Yearly
(Continued)

FOREIGN PATENT DOCUMENTS

EP   0 498 315   8/1992
GB   2 128 294   4/1984
GB   2 243 670   11/1991

OTHER PUBLICATIONS

International Search Report, PCT/NZ2016/050037, dated Jul. 21, 2016.
Written Opinion, PCT/NZ2016/050037, dated Jul. 21, 2016.

*Primary Examiner* — Ian G Paquette
(74) *Attorney, Agent, or Firm* — Young & Thompson

(57) ABSTRACT

This invention relates to a valve for use in a pipe used for transporting a substance. The valve includes a rotatable disc, a valve seat, and an actuator. The actuator is adapted to rotate the rotatable disc between a closed position, where the rotatable disc is substantially perpendicular to the longitudinal axis of the pipe, and whereby the edges of the rotatable disc are adapted to seal against the valve seat, thus preventing the flow of the substance through the valve, and an open position, wherein the rotatable disc is substantially parallel to the longitudinal axis of the pipe, thus allowing for the flow of the substance through the valve. The valve also includes a protective portion adapted to cover at least a portion of the valve seat during the flow of the substance through the valve, when the valve is open.

15 Claims, 3 Drawing Sheets

Figure 1:
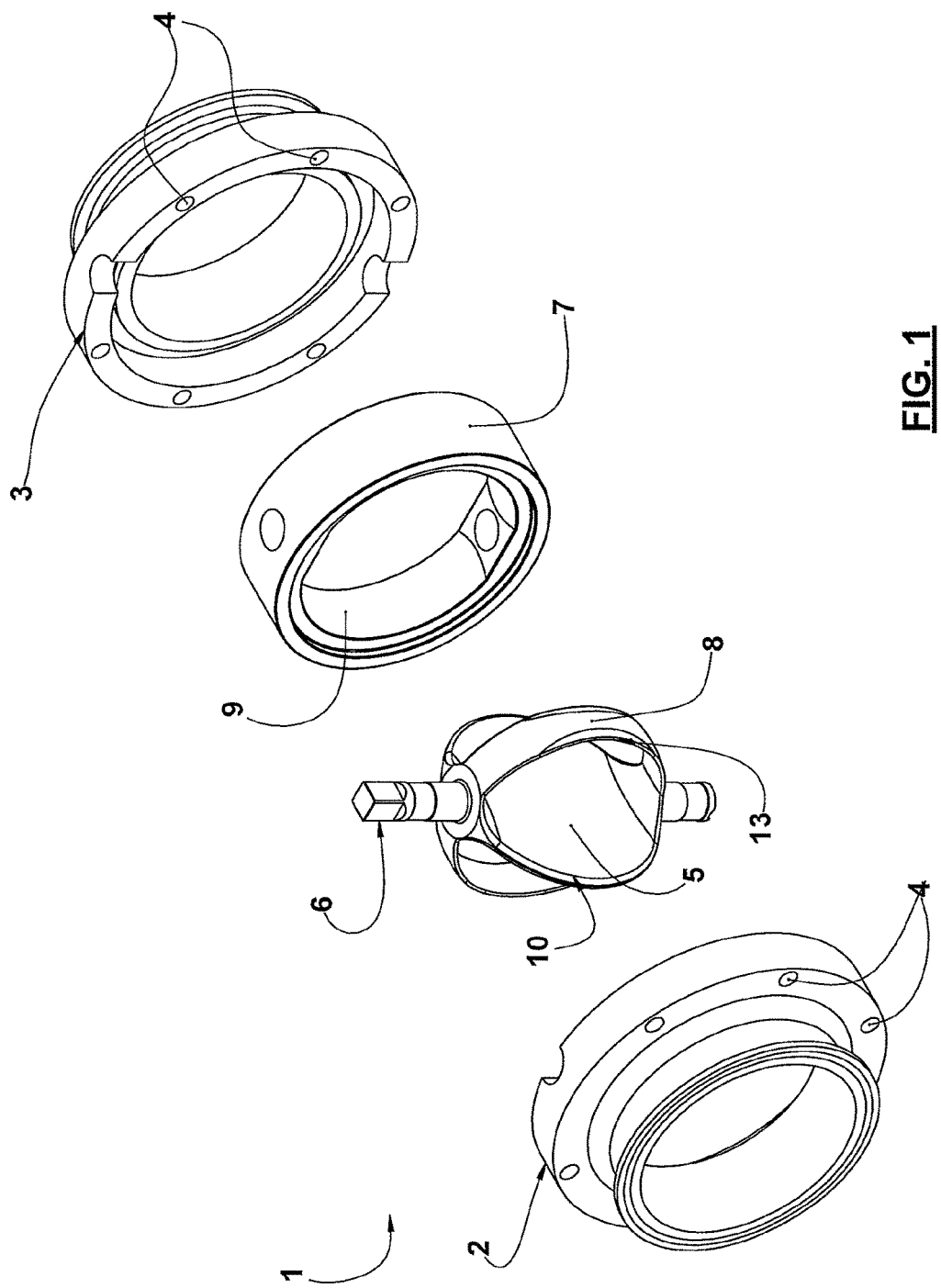

(51) Int. Cl.
*F16K 27/02* (2006.01)
*F16K 25/04* (2006.01)
*F16K 25/00* (2006.01)

(58) Field of Classification Search
CPC .... F16K 1/2261; F16K 1/2263; F16K 1/2265; F16K 1/228; F16K 25/005; F16K 25/04; F16K 27/0218
See application file for complete search history.

(56) References Cited

U.S. PATENT DOCUMENTS

| | | | | |
|---|---|---|---|---|
| 5,103,858 | A * | 4/1992 | Hunt | F16K 1/22 137/340 |
| 7,264,221 | B2 * | 9/2007 | Yeary | F16K 1/22 123/337 |
| 2006/0192167 | A1 * | 8/2006 | Hourai | F16K 1/222 251/305 |
| 2011/0012043 | A1 * | 1/2011 | Metternich | F02M 35/08 251/304 |
| 2017/0089270 | A1 * | 3/2017 | Oblinger | F02D 9/1045 |

* cited by examiner

VALVE

FIELD

This invention relates to a valve, and more specifically to a valve which may be used to regulate or control the flow of a substance along or through a pipe or duct (in one direction only or in either direction)

The valve may be particularly suitable for use in regulating or controlling the flow of powders, along or through a pipe, and for convenience only therefore the invention will be predominantly described in relation to such use.

However, it is to be understood and appreciated that the invention may also have other applications and uses. For example, the valve could also be used to regulate or control the flow of other substances along, or through, a pipe or duct, including fluids, gases and liquids, as well as other types of solids or particulate materials.

The prior art and possible applications of the invention, as discussed below, are therefore given by way of example only.

BACKGROUND

Powdered or particulate products often have to be transported from one place to another via pipes or ducting, and especially so within the factory or manufacturing plant where they are produced and/or packaged.

For example, milk powders may need to be transported, via pipes, from one part of a dairy factory to another, for example from a storage hopper to a packing room, where the milk powder may be packaged into bags. This often involves the milk powder having to travel significant distances, and in substantial volumes, through the pipes. The powder is usually transported through the pipes via vacuum-based transportation technologies.

The flow of powders through pipes or ducts are usually regulated or controlled by the use of shut-off valves, which are placed along the pipes at certain intervals. The valves, when open, allow for the continuous flow of powder along the pipes, and the valves, when closed, prevent or stop the flow of powder along the pipes, at the point where the valve is located.

One type of valve which may be used is a ball valve.

A ball valve is a form of quarter-turn valve which uses a hollow, perforated and pivoting ball (called a "floating ball") to control the flow of powder through it. The valve is open when the aperture within the ball is in line with the flow, and the valve may be closed by rotating the ball 90-degrees by the use of a valve handle. The handle usually lies flat in alignment with the pipe (and flow) when the valve is open, but is perpendicular to the pipe when the valve is closed, making for easy visual confirmation of the valve's status.

Ball valves are generally durable, and usually perform well after many cycles, but primarily only when used with pipes that transport liquids or gases.

A disadvantage associated with the use of ball valves with pipes that are transporting powders (or any particulate material) is that when open, the powder can get stuck around the ball, and subsequently harden due to the flow pressure, and this may make it difficult to properly close the valve, and in some cases the valve may not be able to be properly closed at all.

Another disadvantage associated with ball valves is that the powder may interfere with the valve seat—which is usually in the form of a silicon or rubber bush, within which the ball sits, and against which the ball seals.

That is, powder can get between the ball and the valve seat which may prevent the valve from properly sealing. When this occurs, this may result in the transportation of the powder along the pipes being suspended whilst the valve is cleaned. This results in down time during the manufacturing and/or packaging process, which is clearly unsatisfactory. That is, having to suspend production whilst the valve is regularly cleaned results in lost production time, which therefore has cost and productivity implications.

When used in pipes for transporting milk powder, ball valves and/or the valve seats for same, usually need to be replaced approximately every month due to general wear and tear. Replacing ball valves, and/or the valve seats for same, can be a time-consuming and fiddly job.

Ball valves are also relatively expensive to purchase and install, as well as maintain.

Another type of valve which may be used is a butterfly valve.

A butterfly valve is a valve which utilises a closing mechanism in the form of a disc. Butterfly valves are generally favoured over ball valves because they are cheaper, and lighter in weight—meaning less support is required. The disc is positioned in the centre of the pipe, and passing through the disc is a rod connected to an actuator on the outside of the valve. Rotating the actuator turns the disc either parallel (open) or perpendicular (closed) to the longitudinal axis of the pipe and the direction of flow of powder through the pipe. When the valve is closed, the disc completely blocks off the pipe. When the disc is rotated a quarter turn, the valve is fully open.

Butterfly valves usually have a valve seat in the form of a silicon or rubber bush, which serves to seal the join between the two halves of the valve, as well as providing a seal between the edges of the rotatable disc and the valve seat, when the valve is closed.

A disadvantage associated with butterfly valves is that the abrasive nature of a powder, especially when transported under pressure, can degrade the unprotected valve seat over time, whereby it needs to be regularly replaced. That is, the valve seat needs to be replaced when it degrades to a point when the disc is not able to fully seal against the valve seat when the valve (disc) is closed.

When used in pipes for transporting milk powder, butterfly valves, and/or the valve seats for same, usually need to be replaced approximately every 2-3 weeks. This results in a significant amount of down time, and hence lost production time.

Moreover, for both ball valves and butterfly valves, the abrasive nature of a powder with respect to the valve seats means that parts of the valve seats can be "sand blasted" off, and hence fine particles of rubber or silicon may join the flow of powder and therefore contaminate the powder being transported. This is clearly unsatisfactory, and especially so for food powders such as flour and milk powder.

Perhaps in recognition of the above problems or difficulties there is available what is known as a deflected seat valve, an example being the TYCO SKI JUMP® valve, manufactured by Keystone International Inc. of the USA.

This valve has a profile like a ramp which deflects the abrasive powder over the valve seat, thereby reducing the wear and tear on the valve seat. However, a disadvantage associated with this valve is that is it relatively expensive to purchase, install and/or maintain. Furthermore, this valve only increases the life time of the valve seat to about 2-3 months. Moreover, this valve does not do away with the problem of fine particles of the rubber or silicon valve seat being "sand blasted" off and joining the flow of powder, and therefore contaminating same.

OBJECT

It is an object of the present invention to provide a valve which goes some way towards addressing the aforementioned problems or difficulties, or which at the very least provides the public with a useful choice.

DEFINITIONS

Throughout this specification unless the text requires otherwise, the word 'comprise' and variations such as 'comprising' or 'comprises' will be understood to imply the inclusion of a stated integer or step or group of integers or steps but not the exclusion of any other integer or step or group of integers or steps.

STATEMENTS OF INVENTION

According to one aspect of the present invention, there is provided a valve for use in a pipe used for transporting a substance, said valve including:
a) a rotatable disc,
b) a valve seat,
c) an actuator for rotating the rotatable disc between:
  i. a closed position, wherein the rotatable disc is substantially perpendicular to the longitudinal axis of the pipe, and whereby the edges of the rotatable disc are adapted to seal against the valve seat, thus preventing the flow of the substance through the valve, and
  ii. an open position, wherein the rotatable disc is substantially parallel to the longitudinal axis of the pipe, thus allowing for the flow of the substance through the valve,
d) a protective portion adapted to cover at least a portion of the valve seat during the flow of the substance through the valve, when the valve is open.

According to another aspect of the present invention, there is provided a valve for use in a pipe used for transporting a substance, substantially as described above, wherein the protective portion is adapted to cover the entire valve seat during the flow of the substance through the valve, when the valve is open.

According to another aspect of the present invention, there is provided a valve for use in a pipe used for transporting a substance, substantially as described above, wherein the actuator includes a rod, upon which the rotatable disc is mounted, and whereby the valve may be opened by turning the rod a quarter turn in one direction and the valve may be closed by turning the rod a quarter turn in the opposite direction.

According to another aspect of the present invention, there is provided a valve for use in a pipe used for transporting a substance, substantially as described above, wherein the protective portion is in the form of an annular ring.

According to another aspect of the present invention, there is provided a valve for use in a pipe used for transporting a substance, substantially as described above, wherein the annular ring is mounted on the rod, and is substantially perpendicular to the rotatable disc, the arrangement and construction being such that as the valve is moved from a closed positon to an open position the annular ring is adapted to rotate and come to rest covering at least a portion of the valve seat, when the valve is fully open, thus protecting the valve seat from the effects of the flow of the substance through the valve.

According to another aspect of the present invention, there is provided a valve for use in a pipe used for transporting a substance, substantially as described above, wherein the rod, rotatable disc and annular ring are integrally formed.

According to another aspect of the present invention, there is provided a valve for use in a pipe used for transporting a substance, substantially as described above, wherein the edges of the rotatable disc are adapted to scrape or wipe the inner surface of the valve seat when the valve is being opened and/or closed.

According to another aspect of the present invention, there is provided a valve for use in a pipe used for transporting a substance, substantially as described above, wherein the protective portion, and/or edges of the protective portion, are adapted to scrape or wipe the inner surface of the valve seat when the valve is being opened and/or closed.

According to another aspect of the present invention, there is provided a valve for use in a pipe used for transporting a substance, substantially as described above, wherein the rod, rotatable disc, annular ring and valve seat are mounted within two valve halves, which are joined together.

According to another aspect of the present invention, there is provided a valve for use in a pipe used for transporting a substance, substantially as described above, wherein the substance is a powder.

According to another aspect of the present invention, there is provided a valve for use in a pipe used for transporting a substance, substantially as described above, wherein the substance is milk powder.

According to another aspect of the present invention, there is provided a method for controlling the flow of a substance through a pipe, said method including the step of incorporating one or more valves within the pipe, said one or more valves being substantially as described above.

The valve may be used to regulate and/or control the flow of any substance along or within a pipe (or duct or similar), including fluids, gases and liquids, as well as solids and particulate materials.

Preferably, the valve may be used to regulate and/or control the flow of powders along or within a pipe.

Preferably, the valve may be used to regulate and/or control the flow of milk powders(s) along or within a pipe.

Preferably, the valve may include a rotatable disc (herein: "disc"), a valve seat, an actuator for rotating the rotatable disc, and a protective portion for covering at least a portion of the valve seat during the flow of the substance through the valve, when the valve is open.

The disc may preferably be a circular and solid disc, such as those that are commonly utilised within butterfly valves. The disc may be made of any suitable material, such as metal, metal alloys or plastics.

Preferably, the valve may be in the closed position when the plane of the disc is substantially perpendicular to the longitudinal axis of the pipe, whereby the edges of the disc seal against the inner surface of the valve seat.

Preferably, the valve may be in the open position when the plane of the disc is substantially parallel to the longitudinal axis of the pipe.

Preferably, the valve seat may be designed or adapted to provide a secure seal between the edges of the disc and the inner surface of the valve seat, when the valve is closed. That is, when the disc sits within, and the edges of the disc seal against, the inner surface of the valve seat, thus completely closing off and sealing the valve/pipe.

The valve seat may preferably be made of a silicon material (as many presently available valve seats are). Other possible alternatives include rubber materials or plastics materials Preferably, the actuator may be utilised for rotating the disc between:
i. a closed position, wherein the disc is substantially perpendicular to the longitudinal axis of the pipe, and whereby the edges of the disc are adapted to seal against the valve seat, thus preventing the flow of the substance through the valve, and
ii. an open position, wherein the disc is substantially parallel to the longitudinal axis of the pipe, thus allowing for the flow of the substance through the valve.

In one embodiment, protective portion may be adapted to cover a majority of the inner surface of the valve seat, when the valve is open.

In another embodiment, the protective portion may be adapted to entirely cover the inner surface of the valve seat, when the valve is open.

Preferably, the actuator may include a rod, upon which (or about which) the disc may be mounted, and whereby the valve may be opened (from a closed position) by turning the rod a quarter turn in one direction and the valve may be subsequently closed by turning the rod a quarter turn in the opposite direction.

In one embodiment, the protective portion may be in the form of an annular ring.

In such an embodiment, the annular ring may also be mounted on the rod substantially perpendicular or at right angles to the disc, the arrangement and construction preferably being such that as the valve is moved from a closed positon to an open position, the annular ring is adapted to rotate and come to rest covering at least a portion of the inner surface of the valve seat, when the valve is fully open, thus protecting the valve seat from the effects of the flow of the substance through the valve.

In one embodiment the rod, disc and annular ring may be integrally formed. In an alternative embodiment one or more of the rod, disc, and annular ring may be separate components that are joined together.

The rod, disc and annular ring may be made of any suitable material, but preferably a metal material or alloy such as stainless steel. Other materials may include plastics materials.

Preferably, the edges of the disc may be adapted, or able, to scrape or wipe the inner surface(s) of the valve seat when the valve is being opened and/or closed, thus serving to clean the valve seat during each opening and/or closing.

Preferably, the protective portion, and/or edges of the protective portion, may also be adapted, or able, to scrape or wipe the inner surface(s) of the valve seat when the valve is being opened and/or closed, thus also, or additionally, serving to clean the valve seat during each opening and/or closing.

Preferably, the rod, disc, annular ring and valve seat may be mounted within two valve halves, which are joined (or joinable) together.

In such an embodiment, the two valve halves may preferably be joined together, for example by bolts. Having the valve formed in this way ensures that the disc, annular ring, and/or valve seat may be accessed by removing one half of the two valve halves. For example, the interior of the valve may need to be accessed for cleaning purposes or for replacement of the valve seat.

In such an embodiment, the valve seat may also serve to provide a tight seal between the two valve halves.

The two valve halves may be made of any suitable material, but preferably a metal material or alloy such as stainless steel.

A preferred method for regulating or controlling the flow of a substance through a pipe, includes the step of incorporating one or more valves within the pipe, the one or more valves being substantially as described above.

PREFERRED EMBODIMENTS

The description of a preferred form of the invention to be provided herein, with reference to the accompanying drawing, is given purely by way of example and is not to be taken in any way as limiting the scope or extent of the invention.

DRAWING

Figure 2:
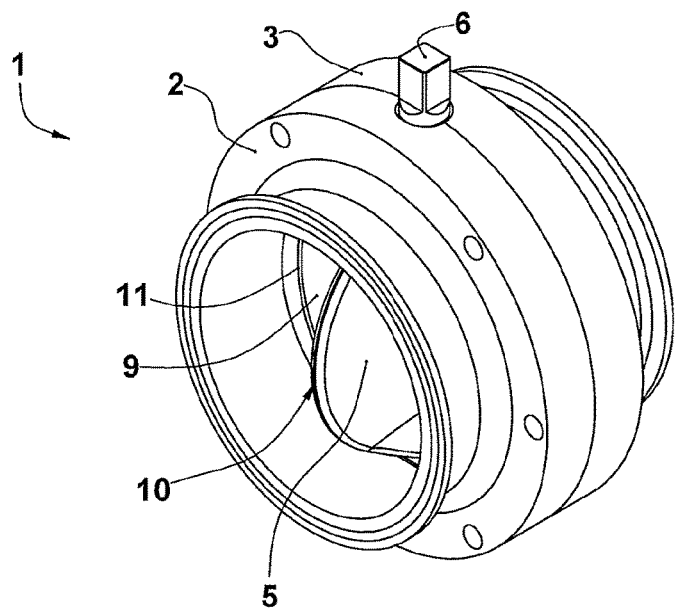
Figure 3:
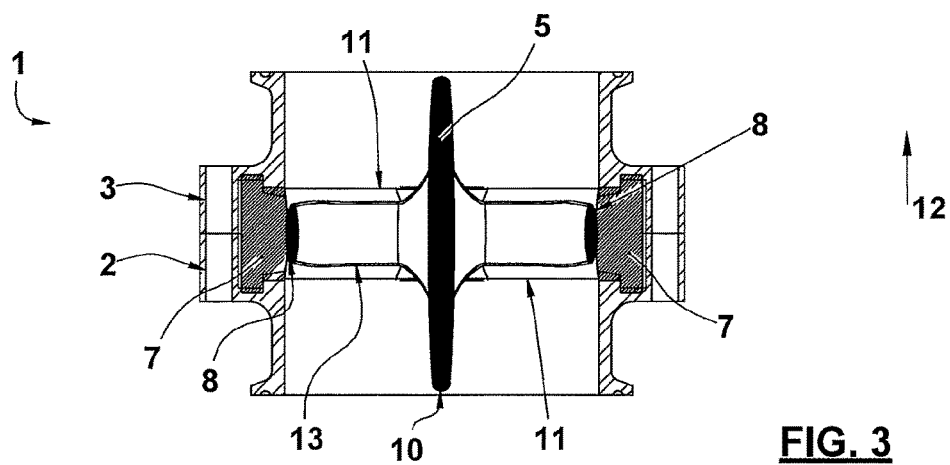
Figure 4:
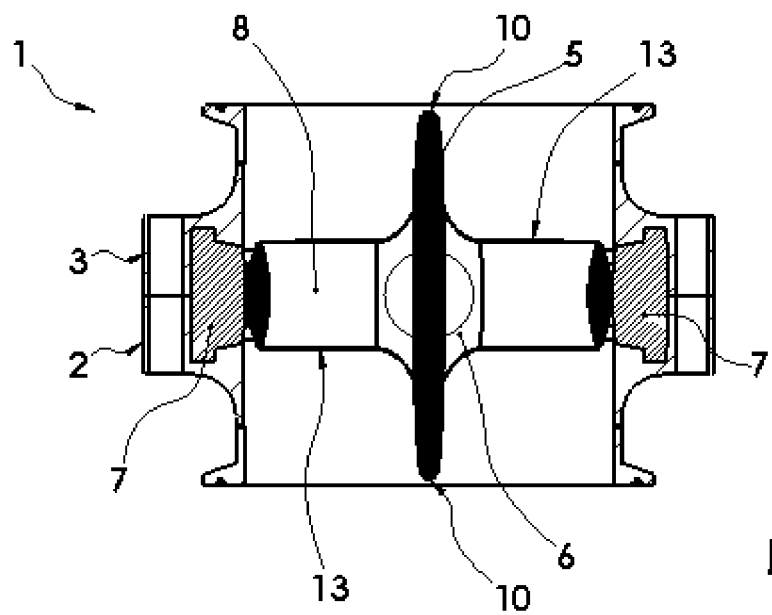
Figure 5:
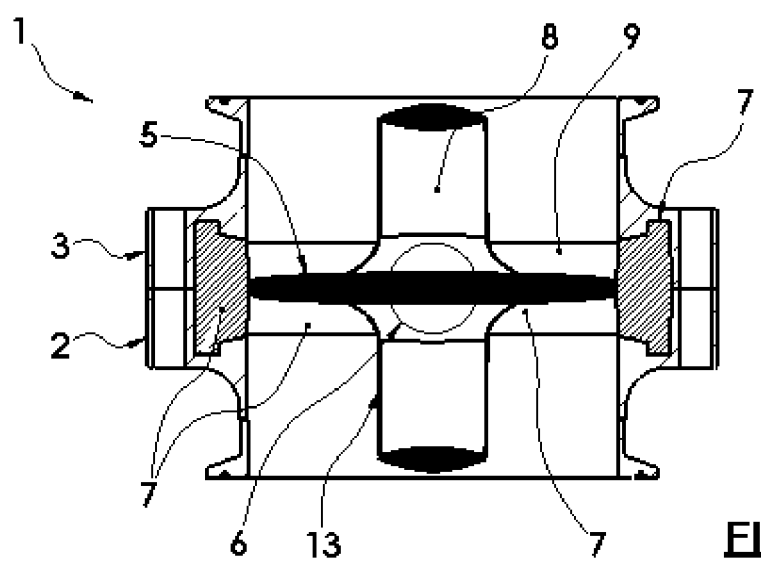

FIG. 1: is an exploded view of a valve, being one possible embodiment of the present invention,
FIG. 2: is a view of the valve of FIG. 1, when assembled,
FIG. 3: is a top cut-away view of the valve of FIG. 2,
FIG. 4: is a top cut-away view of an alternative embodiment of the valve, with the valve open, and
FIG. 5: is a view of the valve of FIG. 4, with the valve closed.

DESCRIPTION OF PREFERRED EMBODIMENTS

Having regard to FIG. 1 there is shown a valve for use in controlling or regulating the flow of a substance through a pipe or duct (pipe or duct not shown), the valve being generally indicated by arrow 1.

The valve 1 depicted may be particularly suitable for use in a pipe used for transporting milk powder within a dairy factory, for example for transporting milk powder from a hopper to a packing room, where the milk powder may be packaged into bags such as 25 kg bags. In such an embodiment, the milk powder is usually transported along the pipes by the use of vacuum-based transportation technologies.

The valve 1 comprises two valve halves 2, 3 which are joined together by bolts (not shown) which are threaded through the apertures 4.

The valve 1 further includes a rotatable disc 5 which is mounted on or within (and fixed with respect to) a rotatable rod 6.

The valve 1 also includes a valve seat 7 in the form of a silicon bush. One function of the valve seat 7 is to provide a tight seal between the two valve halves 2, 3.

The valve 1 also includes a protective portion in the form of an annular ring 8 for covering and/or protecting a majority of (FIGS. 1-3) or the entirety of (FIGS. 4-5) the inner surface 9 of the valve seat 7 during the flow of milk powder through the valve 1, when the valve 1 is open.

The annular ring 8 is fixedly mounted on, or within, the rod 6, and is positioned substantially at right angles to the plane of the disc 5. The annular ring 8 is fixed with respect to both the rod 6 and the disc 5.

The valve 1 may be closed by turning the rod 6 until the plane of the disc 5 is substantially at right angles to the longitudinal axis of the pipe and/or substantially at right angles to the direction of flow of the milk powder through the pipe or valve 1.

When the valve 1 is closed, the edges 10 of the disc 5 seal tightly against the inner surface 9 of the valve seat 7, thus preventing flow of milk powder through the valve 1, and therefore through the pipe (see FIG. 5).

The valve 1 may be opened (from the closed position illustrated in FIG. 5) by turning the rod 6 a quarter turn (or 90°), whereby the plane of the disc 5 is now substantially parallel to the longitudinal axis of the pipe and/or substantially parallel to the direction of flow of the milk powder through the pipe (and through the valve 1). The valve 1 in the open position is illustrated in FIGS. 1-4.

The direction of flow of milk powder is in the direction of the arrow 12 in FIG. 3. That said, the valve 1 would be equally as effective if the direction of flow of milk powder was reversed, that is the valve would work equally well for any direction of flow of milk powder through the valve 1.

All of the components of the valve 1, as illustrated, are comprised of stainless steel, with the exception of the valve seat 7, which is a silicon bush.

When the valve 1 is in the closed position (FIG. 5), which is achieved by turning the rod 6 a quarter turn (or 90°) in the opposite direction to how the valve was opened, the annular ring 8 lies substantially parallel to the longitudinal axis of the pipe, and substantially in the centre of the valve/pipe, as illustrated in FIG. 5.

In all of the embodiments shown, the annular ring 8 covers, and therefore protects, the majority, or all, of the inner surface 9 of the valve seat 7 from the abrasive forces of the flow of milk powder passing through the pipe and valve 1. This means that the valve seat 7 is not "sandblasted" as would normally occur, and hence fine particles of the silicon bush are not sandblasted off the valve seat 7, whereby they may otherwise contaminate the milk powder. This is a significant advantage over presently available valves and valve seats used for the transport of milk powder through pipes or ducting where the valve seat is unprotected from such abrasive actions of the flow of the milk powder.

Furthermore, because the valve seat 7 is mostly or wholly covered and/or protected, the valve seat 7 does not quickly degrade over time, as is common for presently available valve seats (due to the action of the flow of milk powder (or other substance(s)). That is, the general wear and tear inflicted on the valve seat 7 is significantly less than for currently available valves which do not have the protective portion such as the annular ring 8.

Having regard to FIGS. 1-3, we have found that the small exposed portion 11 of the valve seat 7, which is still exposed when the annular ring 8 is otherwise covering the majority of the inner surface 9 of the valve seat 7, is not susceptible to being sandblasted, or otherwise significantly degraded over time, because particles of the milk powder actually embed into the small exposed portion 11 of the valve seat 7, thus protecting it from any of the abrasive forces aforementioned.

Having regard to FIGS. 4 and 5, the annular ring 8 covers or protects the entirety of the inner surface 9 of the valve seat 7 during the flow of milk powder through the valve 1.

FIG. 4 illustrates the valve 1 in the open position, with the plane of the disc 5 being substantially parallel to the longitudinal axis of the pipe and/or substantially parallel to the direction of flow of the milk powder through the pipe (and through the valve 1). The annular ring 8 covers the entirety of the inner surface 9 of the valve seat 7 (hence, no portions of the inner surface 9 of the valve seat 7 are visible in FIG. 4).

FIG. 5 illustrates the valve of FIG. 4 in the closed position, with the plane of the disc 5 being substantially perpendicular to the longitudinal axis of the pipe, and whereby the edges 10 of the disc 5 seal against the inner surface 9 of the valve seat 7. Moreover, the annular ring 8 lies substantially parallel to the longitudinal axis of the pipe, and substantially in the centre of the valve/pipe.

The edges 10 of the disc 5 are adapted, or able, to scrape or wipe the inner surface 9 of the valve seat 7 when the valve 1 is being opened and/or closed, thus serving to clean the inner surface 9 of the valve seat 7 during each opening and/or closing.

Furthermore, the edges 13 of the annular ring are also adapted, or able, to scrape or wipe the inner surface 9 of the valve seat 7 when the valve 1 is being opened and/or closed, thus also, or additionally, serving to clean the valve seat 7 during each opening and/or closing.

Hence, the inner surface 9 of the valve seat 7 is subjected to two scraping or wiping actions during each opening and/or closing of the valve, rather than just one for presently available valves (the one scraping or wiping action being carried out by the edges of the disc only). Having two such scraping or wiping actions serves to keep the inner surface 9 of the valve seat 7 clean and this helps to extend the lifetime of the valve seat 7.

Our testing has shown that the valve 1, incorporating the protective annular ring 8, increases the lifetime of the valve seat 7 to approximately 9-12 months, which is a significant improvement over presently available valves. This results in much less down time (for example, to clean or replace the valve seat), and hence significantly less lost production time as a result.

Moreover, the protective covering of the valve seat 7 (including the inner surface 9 of same) provided by the annular ring 8, when the valve is open, results in no particles of the silicon bush valve seat 7 from being "sandblasted" off, which would otherwise contaminate the milk powder.

Whilst the invention has been predominantly described in relation to the transportation of milk powders through pipes, it is to be understood and appreciated that the valve could be used in pipes used for transporting any type of substance. For example, the valve could also be used to control the flow of any substance within a pipe or duct, such as fluids, gases and liquids, as well as other types of powders or particulate materials or other solids.

VARIATIONS

While the embodiments described above are currently preferred, it will be appreciated that a wide range of other variations might also be made within the general spirit and scope of the invention and/or as defined by the appended claims.

I claim:

1. A valve for use in a pipe used for transporting a substance, said valve including:
    a) a rotatable disc,
    b) a valve seat,
    c) an actuator for rotating the rotatable disc between:
        i a closed position, wherein the rotatable disc is perpendicular to the longitudinal axis of the pipe, and whereby the edges of the rotatable disc are adapted to seal against the valve seat, thus preventing the flow of the substance through the valve, and
        ii. an open position, wherein the rotatable disc is parallel to the longitudinal axis of the pipe, thus allowing the flow of the substance through the valve,
    d) a movable annular ring fixed at right angles with respect to the rotatable disc, the arrangement and construction being such that the annular ring is adapted to cover at least a portion of the valve seat during the flow of the substance through the valve, when the valve is open, wherein the actuator includes a rod, upon which rod the rotatable disc is mounted, and whereby the valve may be opened by turning the rod a quarter turn in one direction and the valve may be closed by turning the rod a quarter turn in the opposite direction and wherein the annular ring is mounted on the rod, and is perpendicular to the rotatable disc, the arrangement and construction being such that as the valve is moved from the closed position to the open position the annular ring is adapted to rotate and come to rest covering at least a portion of the valve seat, when the valve is fully open, thus protecting the valve seat from the effects of the flow of the substance through the valve.

2. A valve for use in a pipe used for transporting a substance, as claimed in claim 1, wherein the annular ring is adapted to cover the entire valve seat during the flow of the substance through the valve, when the valve is open.

3. A valve for use in a pipe used for transporting a substance, as claimed in claim 1, wherein the annular ring is adapted to cover the entire valve seat during the flow of the substance through the valve, when the valve is open.

4. A valve for use in a pipe used for transporting a substance, as claimed in claim 1, wherein the edges of the rotatable disc are adapted to scrape or wipe the inner surface of the valve seat when the valve is being opened and/or closed.

5. A valve for use in a pipe used for transporting a substance, as claimed in claim 4, wherein the annular ring is adapted to cover the entire valve seat during the flow of the substance through the valve, when the valve is open.

6. A valve for use in a pipe used for transporting a substance, as claimed in claim 1, wherein the annular ring, and/or edges of the annular ring, are adapted to scrape or wipe the inner surface of the valve seat when the valve is being opened and/or closed.

7. A valve for use in a pipe used for transporting a substance, as claimed in claim 6, wherein the annular ring is adapted to cover the entire valve seat during the flow of the substance through the valve, when the valve is open.

8. A valve for use in a pipe used for transporting a substance, as claimed in Claim 1, wherein the rod, rotatable disc and annular ring are integrally formed.

9. A valve for use in a pipe used for transporting a substance, as claimed in claim 8, wherein the annular ring is adapted to cover the entire valve seat during the flow of the substance through the valve, when the valve is open.

10. A valve for use in a pipe used for transporting a substance, as claimed in claim 8, wherein the rod, rotatable disc, annular ring and valve seat are mounted within two valve halves, which are joined together.

11. A valve for use in a pipe used for transporting a substance, as claimed in claim 10, wherein the annular ring is adapted to cover the entire valve seat during the flow of the substance through the valve, when the valve is open.

12. A valve for use in a pipe used for transporting a substance, as claimed in claim 1, wherein the substance is a powder.

13. A valve for use in a pipe used for transporting a substance, as claimed in claim 12, wherein the annular ring is adapted to cover the entire valve seat during the flow of the substance through the valve, when the valve is open.

14. A valve for use in a pipe used for transporting a substance, as claimed in claim 12, wherein the powder is milk powder.

15. A valve for use in a pipe used for transporting a substance, as claimed in claim 14, wherein the annular ring is adapted to cover the entire valve seat during the flow of the substance through the valve, when the valve is open.

* * * * *